INVENTORS
ARTHUR POLLAK
THOMAS A. WILLINGHAM
BY
ATTORNEY

Patented May 1, 1945

2,374,700

UNITED STATES PATENT OFFICE 2,374,700

PURIFICATION OF TALL OIL

Arthur Pollak, New York, N. Y., and Thomas A. Willingham, Charleston, S. C., assignors to West Virginia Pulp and Paper Company, New York, N. Y., a corporation of Delaware Application July 29, 1939, Serial No. 287,234

5 Claims. (Cl. 260—97.5)

Our present invention relates to the purification of tall oil. The designation "tall oil" has been given to a mixture of fatty and rosin acids which are obtained as a by-product from the manufacture of pulp from coniferous woods, especially when manufactured by the so called soda or sulfate processes. In the usual process, after the wood has been cooked, the pulp is recovered and the spent treating liquor is evaporated, whereupon the sodium soaps of the fatty and rosin acids are salted out, separated, and the corresponding acids precipitated by acidification. As thus obtained, the mixture of crude fatty and rosin acids, properly designated tall oil or crude tall oil, is a dark viscous liquid having an unpleasant odor. Upon distillation a purified material is obtained, which, nevertheless, is usually rather strongly colored. In common with other oils, the value of tall oil is enhanced by an improvement in the color.

The object of our invention is to improve the color of tall oil, and is predicated upon our discovery that a marked improvement is obtained when tall oil is subjected to heat at a temperature in excess of 400° F. and below that at which substantial pyrolytic decomposition of the oil substance occurs. The action of the heat is apparently to effect a destruction of the color bodies, whereby an improvement results not only in the oil so heated, but also when the heated oil is distilled. Thus by subjecting a crude oil to heat treatment followed by distillation, an oil much lighter in color is obtained than is the case if the heat treatment be omitted, indicating that the heat treatment not only destroys a substantial portion of the color bodies in the first instance but renders those that remain less subject to distillation.

In general the temperature to which the oil is heated is higher than that at which tall oil begins to boil under high vacuum, i. e., 400–450° F., at around 5 mm. pressure. In carrying out our improved process we prefer to use atmospheric pressure (or higher) for the heating step. A peculiarity of the process is that the treatment is without substantial effect upon the color of either rosin or other fatty acids such as red oil; it is, however, effective on tall oil no matter how produced.

Figure 1:
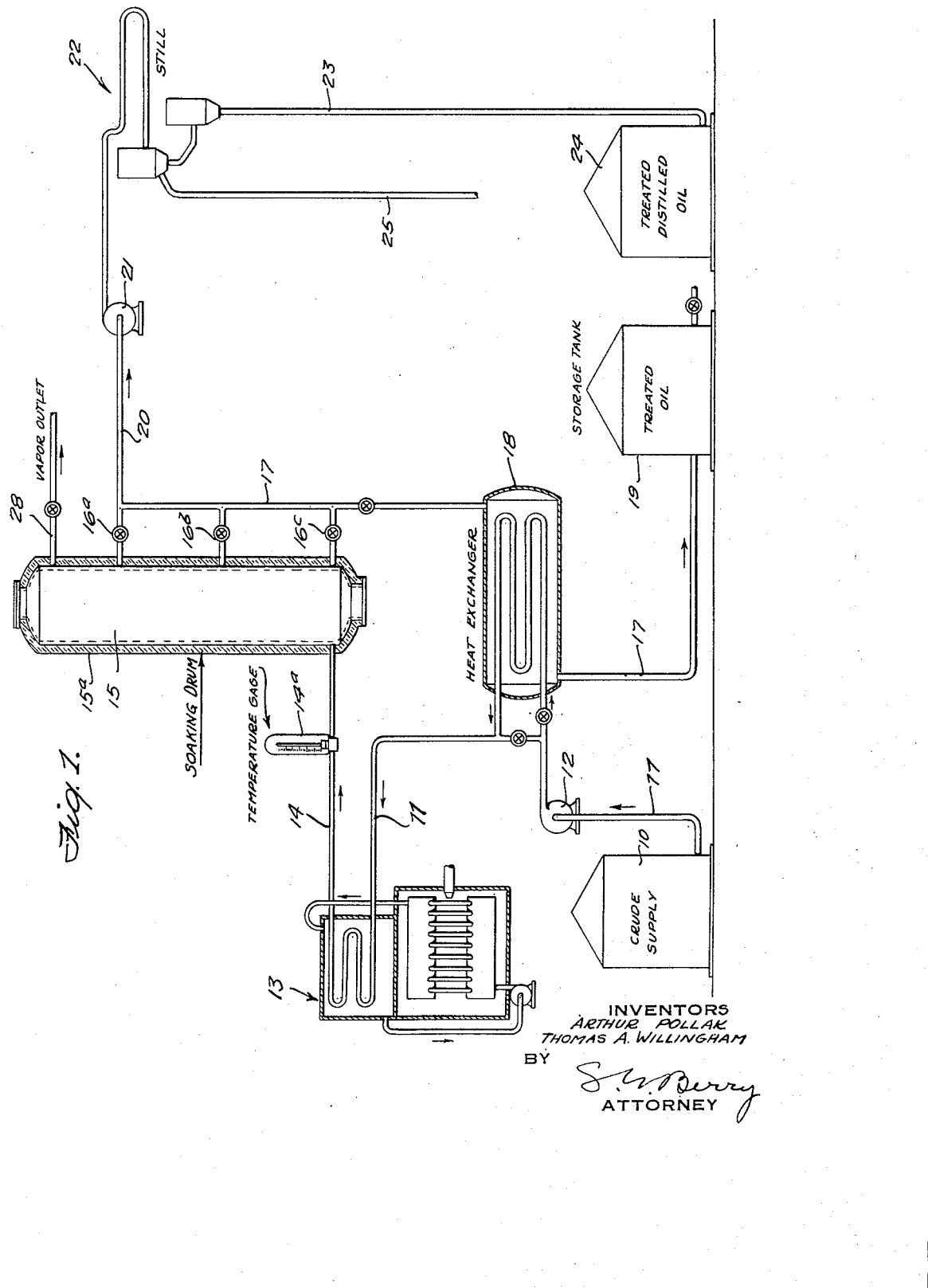
Figure 2:
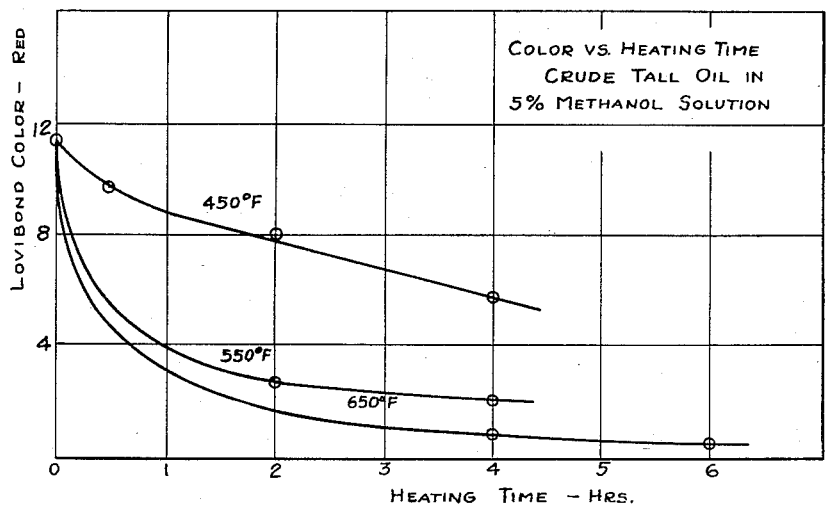
Figure 3:
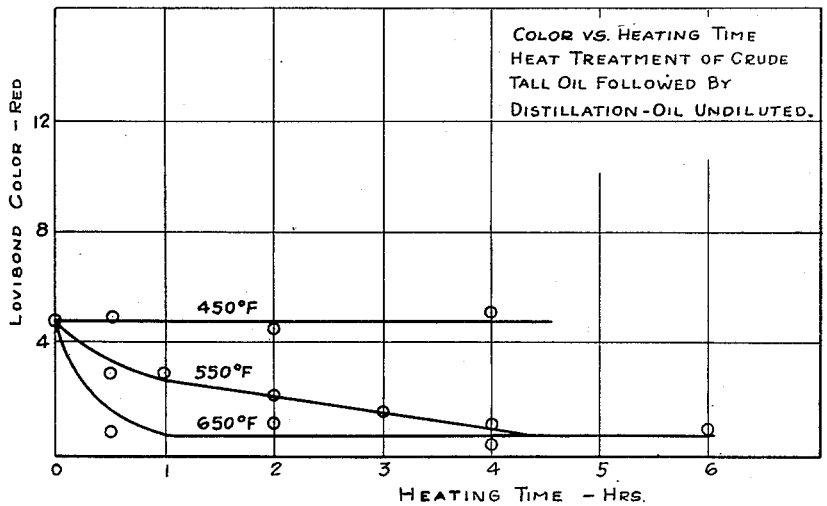

Our invention will be further understood by reference to the following detailed description taken with the annexed drawings in which Fig. 1 shows a setup of apparatus suitable for carrying out the heat treatment;

Fig. 2 is a chart in which the color (red) of the crude tall oil is plotted against the heating time for three given temperatures, a 5% methanol solution of the treated oil being employed for examination of the color; while Fig. 3 is a similar chart showing the effect of heating a crude tall oil followed by distillation for the same three temperatures of heating.

Referring to Fig. 1, crude (or distilled) tall oil from a source of supply 10 is pumped by line 11 and pump 12 through heater 13 of suitable type, e. g., employing diphenyl, and the heated oil conducted therefrom through pipe 14 having therein a temperature indicating device 14a to soaking drum 15 which is provided with a heat insulating jacket 15a.

Optionally the oil passing through pipe 11 may be preheated by being passed through a heat exchanger 18. In drum 15 the heated oil is allowed to remain for such time as will effect the desired improvement in color, whereupon the oil is withdrawn from the drum 15 and passed through any one of a plurality of spaced branch outlets 16a, 16b, 16c, etc. (depending upon the rate of flow of the liquid and hence the time of its stay in the drum 15) to pipe 17, cooler 18 to treated oil storage tank 19. Alternatively, the hot oil from the soaking drum 15 is passed by line 20 and pump 21 directly to still 22 which yields a distilled product through pipe 23 communicating with storage tank 24, and a residue of pitch through pipe 25. As shown, the apparatus is adapted for either continuous or batch operation. The results obtained are independent of the pressure employed, which within limits may be autogenous or any vapors formed and existing above a given pressure may be released through vapor pipe 26.

Reference to the chart, Fig. 2, indicates that temperatures from 450° to 650° F. result in a substantial improvement in the color of the crude material, and that the improvement obtained is a function both of the time and temperature. Thus both the 650° F. and the 550° F. curves reach substantially a minimum after four hours, whereupon continued heating results in a negligible decrease in the color. On the other hand, the 450° F. curve indicates that a considerably longer time than four hours is necessary to give the improvement as represented by the 550° F. and 650° F. curves. Since the crude oil even after treatment is too dark to be used conveniently in the Lovibond colorimeter, a solution is first made in methanol and the color of the methanol solutions of the material treated at different times and temperatures compared. However, upon inspection the untreated crude material will be seen to be a dark brown whereas the same material after treatment is red to dark yellow and transparent. A slight precipitate usually forms after treatment which may be allowed to settle. It can if desired be removed by filtration.

Referring to Fig. 3, the effect of time and temperature of heating upon a crude tall oil followed by distillation is shown, from which it will be noted that a marked improvement results after one hour's heating at 650° F., or four hours' heating at 550° F. On the other hand, heating at 450° F. is without any substantial effect upon the color. The effect of the heat treatment will be apparent from the fact that if the crude oil be subjected to the same distillation without the heat treatment, it would have a color of Lovibond yellow 70 and Lovibond red 5 (half column); whereas when the distillation is preceded by the heat treatment the color for the same material started with is Lovibond red 1 (indicated in Fig. 3) and the Lovibond yellow is 20, i. e., for a heat treatment at 550° F. for four hours. In view of the foregoing it will be obvious that a wide choice of temperature and time conditions is afforded, and the choice of these will depend in large part upon the apparatus available and, to some extent, upon the properties of the tall oil which may vary slightly, depending upon the source. Temperatures substantially lower than 450° F., say below 400° F., usually require too long a soaking time to be effective. Temperatures somewhat higher than 650° F. may be used provided the time factor is short enough; but obviously substantially higher temperatures than this will result in excessive decomposition of the oil due to pyrolysis, with the formation of excessive quantities of gas, carbon, etc. Thus, an excessive loss of material will occur and the resulting product, instead of being improved in color, may be rendered darker. In the distillation of tall oil it is usual to employ a rather high vacuum and to subject the oil to the distillation temperature, e. g., 600° to 650° F., over a very short time interval, an example of such distillation being indicated in the patent to Frankel and Pollak No. 2,143,344. On the other hand, in the ordinary batch distillation employing a pot still the material is held at the distillation temperatures for so long a time that the beneficial effect of our invention is not had. In any event, due to lack of correlation between the time and temperature factors we have been unable to obtain the beneficial effect of our invention by simple distillation according to existing processes known to us.

In practising the invention it is desirable either to start with tall oil which is substantially anhydrous or else to release the pressure in the soaking drum at a safe value in order to prevent the formation of excessive pressures due to the presence of steam. When a continuous method is employed followed by distillation of the hot oil the vapor outlet 28 may be connected with the vapor space of the still 22 by a line not shown. Desirably the heat treatment is carried out in absence of air, and in starting up the treating plant shown the air in the system may be removed by use of steam or neutral gas such as $CO_2$, etc.

The process may be carried out in apparatus of widely different types, the main requisite being that the oil shall be heated in a sufficiently uniform manner as to prevent local overheating and damaging of the oil material. As will be evident from an inspection of Figs. 2 and 3, it is unnecessary to sharply cool or quench the hot oil when operating at temperatures at 550° F. or under. When operating at the higher temperatures, however, it is desirable to arrest the reaction by cooling when substantially the maximum decolorization of the oil has taken place, and for this purpose the cooler 18 may be employed in which the cooling medium may be either the oil entering the system, as shown, or an independent cooling medium; or an air cooler may be used.

We claim:

1. In the purification of tall oil, the step of improving the color thereof, which comprises heating the same in the absence of air to a temperature in excess of 400° F. and below that at which substantial, pyrolytic decomposition of the oil substance occurs for the period of time during which the oil is heated, and maintaining such temperature until a substantial part of the color bodies contained in said oil is destroyed and rendered less volatile, but terminating said treatment before any substantial pyrolysis of the oil substance has taken place, all without otherwise chemically altering the oil substance, and thereafter distilling the so treated oil, leaving behind a substantial portion of the color bodies originally present.

2. The method according to claim 1, in which the temperature is not raised substantially beyond 650° F.

3. The method according to claim 1, in which the oil is first rendered substantially anhydrous.

4. In the purification of tall oil, the step of improving the color thereof, which comprises passing said oil through a heated zone and out of contact with the air so as to heat said oil substantially uniformly to a temperature in excess of 400° F. and below that at which substantial pyrolytic decomposition of the oil substance occurs for the period of time during which the oil is heated, maintaining such temperature until a substantial part of the color bodies contained in said oil is destroyed, but terminating said treatment before any substantial pyrolysis of the oil substance has taken place, all without otherwise chemically altering the oil substance, and thereafter distilling the so treated oil, leaving behind a substantial portion of the color bodies originally present.

5. In the purification of tall oil, the step of improving the color thereof, which comprises heating crude tall oil in the absence of air to a temperature in excess of 400° F. and below that at which substantial pyrolytic decomposition of the oil substance occurs for the period of time during which the oil is heated, and maintaining such temperature until a substantial part of the color bodies contained in said oil is destroyed and rendered less volatile, but terminating said treatment before any substantial pyrolysis of the oil substance has taken place, all without otherwise chemically altering the oil substance, and thereafter distilling the so treated oil, leaving behind a substantial portion of the color bodies originally present.

ARTHUR POLLAK.
THOMAS A. WILLINGHAM.